United States Patent [19]
Tholen et al.

[11] Patent Number: 5,867,462
[45] Date of Patent: Feb. 2, 1999

[54] APPARATUS AND METHOD FOR RECORDING AND READING EDIT DATA PERTAINING TO REPRODUCTION OF INFORMATION SIGNALS AND/OR PORTIONS THEREOF RECORDED ON A RECORD CARRIER

[75] Inventors: Antonius H. L. Tholen; Jacobus P. C. Kroon, both of Eindhoven, Netherlands

[73] Assignee: U.S. Philips Corporation, New York, N.Y.

[21] Appl. No.: 667,848

[22] Filed: Mar. 12, 1991

[30] Foreign Application Priority Data

Mar. 13, 1990 [NL] Netherlands ............................ 9000571
Nov. 15, 1990 [NL] Netherlands ............................ 9002490

[51] Int. Cl.$^6$ ...................................................... G11B 7/00
[52] U.S. Cl. ................................................. 369/48; 369/58
[58] Field of Search .................................. 369/48, 49, 47, 369/54, 58, 32, 50, 44.32, 59; 360/78.04, 72.2

[56] References Cited

U.S. PATENT DOCUMENTS

| 4,675,755 | 6/1987 | Baumeister et al. | 360/72.2 |
| 4,858,217 | 8/1989 | Fujiie et al. | 369/59 |
| 4,999,825 | 3/1991 | Raaymakers et al. | 369/44.26 |
| 5,065,388 | 11/1991 | Roth et al. | 369/47 |

FOREIGN PATENT DOCUMENTS

| 0281415 | 9/1988 | European Pat. Off. . |
| 0288571 | 11/1988 | European Pat. Off. . |

Primary Examiner—Muhammad N. Edun
Attorney, Agent, or Firm—Edward Blocker

[57] ABSTRACT

Apparatus and method for use in recording and reading edit data pertaining to reproduction of information signals and/or portions thereof recorded on a record carrier. Edit data includes skip information (identifying information signals and/or portion thereof for which reproduction is undesired) and/or restore information (denoting invalid skip information). The edit data enables determination as to which information signals and/or portions thereof should be inhibited during reproduction.

29 Claims, 10 Drawing Sheets

| FRNO | ADDR | POINT | MIN | SEC | FRAME | PMIN | PSEC | PFRAME |
|---|---|---|---|---|---|---|---|---|
| 1 | 01 | 01 | | | | 00 | 02 | 32 |
| 2 | 01 | 01 | | | | 00 | 02 | 32 |
| 3 | 01 | 01 | | | | 00 | 02 | 32 |
| 4 | 05 | A0 | 00 | 00 | 00 | 02 | 00 | 00 |
| 5 | 05 | A0 | 00 | 00 | 00 | 02 | 00 | 00 |
| 6 | 05 | A0 | 00 | 00 | 00 | 02 | 00 | 00 |
| 7 | 01 | 02 | | | | 10 | 15 | 12 |
| 8 | 01 | 02 | | | | 10 | 15 | 12 |
| 9 | 01 | 02 | | | | 10 | 15 | 12 |
| 10 | 05 | A1 | 02 | 05 | 00 | 00 | 00 | 00 |
| 11 | 05 | A1 | 02 | 05 | 00 | 00 | 00 | 00 |
| 12 | 05 | A1 | 02 | 05 | 00 | 00 | 00 | 00 |
| 13 | 01 | 03 | | | | 12 | 01 | 16 |
| 14 | 01 | 03 | | | | 12 | 01 | 16 |
| 15 | 01 | 03 | | | | 12 | 01 | 16 |
| 16 | 05 | 01 | 23 | 25 | 12 | 23 | 12 | 37 |
| 17 | 05 | 01 | 23 | 25 | 12 | 23 | 12 | 37 |
| 18 | 05 | 01 | 23 | 25 | 12 | 23 | 12 | 37 |
| 19 | 01 | 04 | | | | 23 | 12 | 40 |
| 20 | 01 | 04 | | | | 23 | 12 | 40 |
| 21 | 01 | 04 | | | | 23 | 12 | 40 |
| 22 | 05 | 02 | 51 | 48 | 41 | 51 | 08 | 03 |
| 23 | 05 | 02 | 51 | 48 | 41 | 51 | 08 | 03 |
| 24 | 05 | 02 | 51 | 48 | 41 | 51 | 08 | 03 |
| 25 | 01 | 05 | | | | 28 | 51 | 65 |
| 26 | 01 | 05 | | | | 28 | 51 | 65 |
| 27 | 01 | 05 | | | | 28 | 51 | 65 |
| 28 | 01 | 06 | | | | 29 | 12 | 71 |
| 30 | 01 | 06 | | | | 29 | 12 | 71 |
| 30 | 01 | 06 | | | | 29 | 12 | 71 |
| 31 | 01 | A0 | | | | 01 | 00 | 00 |
| 32 | 01 | A0 | | | | 01 | 00 | 00 |
| 33 | 01 | A0 | | | | 01 | 00 | 00 |
| 34 | 01 | A0 | | | | 06 | 00 | 00 |
| 35 | 01 | A1 | | | | 06 | 00 | 00 |
| 36 | 01 | A1 | | | | 06 | 00 | 00 |
| 37 | 01 | A2 | | | | 52 | 48 | 41 |
| 38 | 01 | A2 | | | | 52 | 48 | 41 |
| 39 | 01 | A2 | | | | 52 | 48 | 41 |

FIG. 7

| FRNO | COAD | TNO | POINT | MIN | SEC | FRM | PMIN | PSEC | PFRM |
|------|------|-----|-------|-----|-----|-----|------|------|------|
| 1 | 01 | 00 | AB | 20 | 15 | 14 | 00 | 00 | 00 |
| 2 | 01 | 00 | AB | 20 | 15 | 14 | 00 | 00 | 00 |
| 3 | 01 | 00 | AB | 20 | 15 | 14 | 00 | 00 | 00 |
| 4 | 01 | 00 | AB | 20 | 15 | 14 | 00 | 00 | 00 |
| 5 | 01 | 00 | AB | 20 | 15 | 14 | 00 | 00 | 00 |
| 6 | 01 | 00 | AB | 20 | 15 | 14 | 00 | 00 | 00 |
| 7 | 01 | 00 | AB | 20 | 15 | 14 | 00 | 00 | 00 |
| 8 | 01 | 00 | AB | 20 | 15 | 14 | 00 | 00 | 00 |
| 9 | 01 | 00 | AB | 20 | 15 | 14 | 00 | 00 | 00 |
| 10 | 01 | 00 | AB | 20 | 15 | 14 | 00 | 00 | 00 |
| 11 | 01 | 00 | 01 | 05 | 45 | 67 | 00 | 02 | 01 |
| 12 | 01 | 00 | 01 | 05 | 45 | 67 | 00 | 02 | 01 |
| 13 | 01 | 00 | 01 | 05 | 45 | 67 | 00 | 02 | 01 |
| 14 | 01 | 00 | 01 | 05 | 45 | 67 | 00 | 02 | 01 |
| 15 | 01 | 00 | 01 | 05 | 45 | 67 | 00 | 02 | 01 |
| 16 | 01 | 00 | 01 | 05 | 45 | 67 | 00 | 02 | 01 |
| 17 | 01 | 00 | 01 | 05 | 45 | 67 | 00 | 02 | 01 |
| 18 | 01 | 00 | 01 | 05 | 45 | 67 | 00 | 02 | 01 |
| 19 | 01 | 00 | 01 | 05 | 45 | 67 | 00 | 02 | 01 |
| 20 | 01 | 00 | 01 | 05 | 45 | 67 | 00 | 02 | 01 |
| 21 | 71 | 00 | 02 | 12 | 01 | 09 | 05 | 45 | 67 |
| 22 | 71 | 00 | 02 | 12 | 01 | 09 | 05 | 45 | 67 |
| 23 | 71 | 00 | 02 | 12 | 01 | 09 | 05 | 45 | 67 |
| 24 | 71 | 00 | 02 | 12 | 01 | 09 | 05 | 45 | 67 |
| 25 | 71 | 00 | 02 | 12 | 01 | 09 | 05 | 45 | 67 |
| 26 | 71 | 00 | 02 | 12 | 01 | 09 | 05 | 45 | 67 |
| 27 | 71 | 00 | 02 | 12 | 01 | 09 | 05 | 45 | 67 |
| 28 | 71 | 00 | 02 | 12 | 01 | 09 | 05 | 45 | 67 |
| 29 | 71 | 00 | 02 | 12 | 01 | 09 | 05 | 45 | 67 |
| 30 | 71 | 00 | 02 | 12 | 01 | 09 | 05 | 45 | 67 |
| 31 | 01 | 00 | 03 | 45 | 33 | 53 | 12 | 01 | 09 |
| 32 | 01 | 00 | 03 | 45 | 33 | 53 | 12 | 01 | 09 |
| 33 | 01 | 00 | 03 | 45 | 33 | 53 | 12 | 01 | 09 |
| 34 | 01 | 00 | 03 | 45 | 33 | 53 | 12 | 01 | 09 |
| 35 | 01 | 00 | 03 | 45 | 33 | 53 | 12 | 01 | 09 |
| 36 | 51 | 00 | 03 | 12 | 06 | 09 | 12 | 01 | 09 |
| 37 | 51 | 00 | 03 | 12 | 06 | 09 | 12 | 01 | 09 |
| 38 | 51 | 00 | 03 | 12 | 06 | 09 | 12 | 01 | 09 |
| 39 | 51 | 00 | 03 | 12 | 06 | 09 | 12 | 01 | 09 |
| 40 | 51 | 00 | 03 | 12 | 06 | 09 | 12 | 01 | 09 |

FIG.8

| FRNO | COAD | TNO | POINT | MIN | SEC | FRM | PMIN | PSEC | PRFM |
|------|------|-----|-------|-----|-----|-----|------|------|------|
| 1 | 02 | 00 | 00 | 20 | 15 | 14 | 00 | 00 | 00 |
| .. | .. | .. | .. | .. | .. | .. | .. | .. | .. |
| 10 | 02 | 00 | 00 | 20 | 15 | 14 | 00 | 00 | 00 |
| 11 | 01 | 00 | 01 | 05 | 45 | 67 | 00 | 02 | 01 |
| 12 | 01 | 00 | 01 | 05 | 45 | 67 | 00 | 02 | 01 |
| 13 | 01 | 00 | 01 | 05 | 45 | 67 | 00 | 02 | 01 |
| 14 | 01 | 00 | 01 | 05 | 45 | 67 | 00 | 02 | 01 |
| 15 | 01 | 00 | 01 | 05 | 45 | 67 | 00 | 02 | 01 |
| 16 | 01 | 00 | 02 | 12 | 01 | 09 | 05 | 45 | 67 |
| 17 | 01 | 00 | 02 | 12 | 01 | 09 | 05 | 45 | 67 |
| 18 | 01 | 00 | 02 | 12 | 01 | 09 | 05 | 45 | 67 |
| 19 | 01 | 00 | 02 | 12 | 01 | 09 | 05 | 45 | 67 |
| 20 | 01 | 00 | 02 | 12 | 01 | 09 | 05 | 45 | 67 |
| 21 | 01 | 00 | 03 | 30 | 17 | 42 | 12 | 01 | 09 |
| 22 | 01 | 00 | 03 | 30 | 17 | 42 | 12 | 01 | 09 |
| 23 | 01 | 00 | 03 | 30 | 17 | 42 | 12 | 01 | 09 |
| 24 | 01 | 00 | 03 | 30 | 17 | 42 | 12 | 01 | 09 |
| 25 | 01 | 00 | 03 | 30 | 17 | 42 | 12 | 01 | 09 |
| 26 | 01 | 00 | 04 | 37 | 50 | 18 | 30 | 17 | 42 |
| 27 | 01 | 00 | 04 | 37 | 50 | 18 | 30 | 17 | 42 |
| 28 | 01 | 00 | 04 | 37 | 50 | 18 | 30 | 17 | 42 |
| 29 | 01 | 00 | 04 | 37 | 50 | 18 | 30 | 17 | 42 |
| 30 | 01 | 00 | 04 | 37 | 50 | 18 | 30 | 17 | 42 |
| 31 | 03 | 00 | 01 | 02 | 03 | 04 | 00 | 00 | 00 |
| 32 | 03 | 00 | 01 | 02 | 03 | 04 | 00 | 00 | 00 |
| 33 | 03 | 00 | 01 | 02 | 03 | 04 | 00 | 00 | 00 |
| 34 | 03 | 00 | 01 | 02 | 03 | 04 | 00 | 00 | 00 |
| 35 | 03 | 00 | 01 | 02 | 03 | 04 | 00 | 00 | 00 |
| 36 | 05 | 00 | 01 | 05 | 45 | 67 | 05 | 42 | 67 |
| 37 | 05 | 00 | 01 | 05 | 45 | 67 | 05 | 42 | 67 |
| 38 | 05 | 00 | 01 | 05 | 45 | 67 | 05 | 42 | 67 |
| 39 | 05 | 00 | 01 | 05 | 45 | 67 | 05 | 42 | 67 |
| 40 | 05 | 00 | 01 | 05 | 45 | 67 | 05 | 42 | 67 |
| 41 | 01 | 00 | 05 | 42 | 16 | 32 | 37 | 50 | 18 |
| 42 | 01 | 00 | 05 | 42 | 16 | 32 | 37 | 50 | 18 |
| 43 | 01 | 00 | 05 | 42 | 16 | 32 | 37 | 50 | 18 |
| 44 | 01 | 00 | 05 | 42 | 16 | 32 | 37 | 50 | 18 |
| 45 | 01 | 00 | 05 | 42 | 16 | 32 | 37 | 50 | 18 |
| 46 | 04 | 00 | 01 | 03 | 04 | 00 | 00 | 00 | 00 |
| 47 | 04 | 00 | 01 | 03 | 04 | 00 | 00 | 00 | 00 |
| 48 | 04 | 00 | 01 | 03 | 04 | 00 | 00 | 00 | 00 |
| 49 | 04 | 00 | 01 | 03 | 04 | 00 | 00 | 00 | 00 |
| 50 | 04 | 00 | 01 | 03 | 04 | 00 | 00 | 00 | 00 |
| 51 | 05 | 00 | 02 | 12 | 09 | 06 | 12 | 01 | 09 |
| 52 | 05 | 00 | 02 | 12 | 09 | 06 | 12 | 01 | 09 |
| 53 | 05 | 00 | 02 | 12 | 09 | 06 | 12 | 01 | 09 |
| 54 | 05 | 00 | 02 | 12 | 09 | 06 | 12 | 01 | 09 |
| 55 | 05 | 00 | 02 | 12 | 09 | 06 | 12 | 01 | 09 |
| 56 | 06 | 00 | 01 | 01 | 00 | 00 | 00 | 00 | 00 |
| 57 | 06 | 00 | 01 | 01 | 00 | 00 | 00 | 00 | 00 |
| 58 | 06 | 00 | 01 | 01 | 00 | 00 | 00 | 00 | 00 |
| 59 | 06 | 00 | 01 | 01 | 00 | 00 | 00 | 00 | 00 |
| 60 | 06 | 00 | 01 | 01 | 00 | 00 | 00 | 00 | 00 |

APPARATUS AND METHOD FOR RECORDING AND READING EDIT DATA PERTAINING TO REPRODUCTION OF INFORMATION SIGNALS AND/OR PORTIONS THEREOF RECORDED ON A RECORD CARRIER

FIELD OF THE INVENTION

The invention relates to an information recording device for receiving information signals to be recorded, and recording them on a record carrier together with and a Table of contents in which the opening addresses of the recorded information signals are included.

The invention further relates to an information read device for reading a record carrier on which information signals and a Table of contents with opening addresses of the recorded information signals are recorded, producing at an output the information signals that have been read out, and for controlling the reading operation in accordance with to the Table of contents.

BACKGROUND OF THE INVENTION

Recording/read devices of this type are known from, for example, EP-A-0 288 571. In the information recording device described therein a Table of contents is recorded specifying the opening and closing addresses of the passages of the recorded information signals intended for reproduction. If the information signals are recorded on a record carrier of an inscribable type, a problem exists in that it is no longer possible once the Table of contents has been recorded to modify opening and closing addresses that have already been recorded, for example, so as to avoid specific undesired passages at the beginning or end of an information signal, in the form of a piece of music, and as such, they are made audible when the record carrier is played. This implies that the selection of the opening and closing addresses is to be made with extreme caution so as to avoid undesired passages being reproduced when the record carrier is played.

It is an object of the invention to provide a device whereby the reproduction of undesired passages of the recorded information signals, lying within the parts specified by the recorded Table of contents of the recorded information signals is inhibited.

SUMMARY OF THE INVENTION

The information recording device of the invention is characterized in that it comprises control unit for causing edit data to be recorded on the record carrier, which edit data contains opening and closing addresses of passages of the recorded information signals for which reproduction is undesired.

The information read device of the invention is characterized in that it comprises read/write head for reading edit data recorded on the record carrier including opening and closing addresses of passages of the information signals for which reproduction is undesired, and a signal-muting circuit for inhibiting reproduction of the passages specified by such opening and closing addresses.

The information recording device presents the user with the option of recording on the record carrier, after the recording of the Table of contents, the opening and closing addresses of specific passages whose reproduction is undesired. When the record carrier is read out, the passages specified by the edit data are not produced at the output, and in this manner reproduction of these passages is inhibited.

An embodiment of the information recording device is characterized in that the edit data contains information indicating for which information signals reproduction as a whole is undesired. This embodiment has the advantage that the necessary space on the record carrier for the edit data may remain extremely small even for the case where the reproduction of an information signal as a whole is undesired. In addition, the user need not specify opening and closing addresses of the passage for which reproduction is undesired.

Another embodiment of the information recording device is characterized in that the edit data may contain restore information denoting that previously recorded edit data is invalid. This embodiment is advantageous in that the effect of previously recorded edit data can be cancelled.

Another embodiment of the information recording device is characterized in that the device comprises a read/write head for recording on the record carrier a provisional Table of contents containing the opening and closing addresses of the recorded information signals; a control unit for deriving a final Table of contents from the recorded provisional Table of contents and recorded edit data, which final Table of contents contains opening addresses of the recorded information signals and opening and closing addresses of information signal passages for which reproduction is undesired; and a read/write head for recording the final Table of contents on the record carrier. This embodiment makes it possible, once the user has recorded all desired information signals and selected therefrom all information elegible for reproduction, to record a final Table of contents which can be read out by means of players for CDs of the read-only type. On CDs of this type, a Table of contents (TOC) is recorded having a format of a type that necessitates in order to extend the Table of contents that the data already included therein be modified. Consequently such a Table of contents cannot be made final until all data to be included therein is known.

A further embodiment of the information recording device is characterized in that the device comprises a formatting circuit for formatting a Table of contents prior to the recording of the same in accordance with a data format in which bit group combinations representing an address of a recorded information signal alternate with bit group combinations representing edit data. This embodiment is advantageous in that the addresses of the recorded information signals can be readily distinguished from the edit data.

An embodiment of the information read device is characterized in that the device comprises a signal-muting circuit for fading in or fading out the reproduced information signal, a control unit being coupled to the signal-muting circuit for causing the reproduced information signal to be faded in to a normal level in response to the edit data when the information signal part immediately following a closing address of the edit data is reproduced, and for causing the reproduced information signal to be faded out to the zero level when the information signal part immediately preceding an opening address of the edit data is reproduced. This embodiment is especially advantageous as to the recording and reproduction of information signals in the form of sound signals, because abrupt and, thus, annoying transitions at the beginning and end of a reproduction of the sound signal are avoided.

It should be observed that the invention is pre-eminently suitable for use for the recording of information signals on a record carrier of a write-once type. However, the invention is not restricted to such use. The invention can also be advantageously applied to record carriers of a re-inscribable type. In that case, however, re-assembling the Table of contents when edit data and/or opening and/or closing addresses of the recorded information signals are modified may be time-consuming compared to simply adding the edit data.

BRIEF DESCRIPTION OF THE DRAWINGS

The invention will be further explained with reference to the FIGS. 1 through 11, in which:

FIGS. 8 and 8a show a combined provisional Table of contents and provisional Skip Table in a form suitable for recording in a separate Program Memory Area.

DESCRIPTION OF THE PREFERRED EMBODIMENTS

Figure 1:
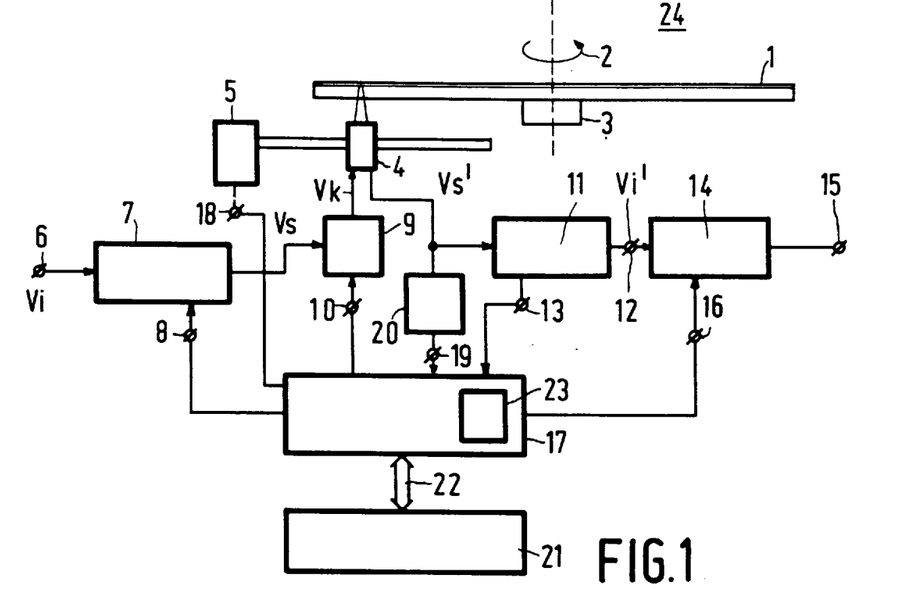
FIG. 1 shows an embodiment of the information recording device and information read device according to the invention.

FIG. 1 shows an exemplary embodiment of a combined information recording device and information read device 24 according to the invention. The device shown is a device in which information can be optically recorded on an optical record carrier 1 and can be read therefrom. Such a record carrier may be of a type described in detail in EP-A-0 325 330, which Application is hereby considered to be included in the description by way of reference. The record carrier 1 rotating in a customary fashion around an axis 2 is driven by a drive motor 3. Opposite the rotating record carrier is a customary optical read/write head 4 that can be moved in radial direction relative to the record carrier 1 by means of a positioning mechanism 5. Information signals Vi to be recorded, for example, audio or video signals, can be applied to an input 6. The applied information signals Vi are formatted and modulated by a signal formatting circuit 7, for example, in accordance with a method prescribed by a CD standard. In addition, through input 8 of the signal formatting circuit 7, subcode information is added to the information signal to be recorded. A modulated recording signal Vs thus formatted and containing subcode information is applied to a read/write control circuit 9 for the optical read/write head 4. The read/write control circuit 9 converts, in a customary fashion, the recording signal Vs into a control signal Vk for the read/write head 4 to record on the record carrier 1, in response to this control signal, an information pattern corresponding to the signal Vs.

The recorded information pattern can be read out by causing the read/write head 4 to assume the read mode through a control read/write input 10 of the control circuit 9 and, thereafter, by positioning the read/write head 4 opposite the part of the record carrier containing the information pattern.

A signal Vs' corresponding to the information pattern and scanned by the read/write head 4 is produced at the output of the read/write head 4. The signal Vs' is applied to a demodulating circuit 11 which demodulates and deformats the signal Vs', and removes the subcode information. The information signal Vi' which is deformatted, decoded and freed from the subcode information is reproduced at an output 12 of the demodulating circuit stage 11, whereas the subcode information is produced at an output 13 of the demodulating circuit 11. The information signal Vi' is passed through a controllable signal-muting circuit 14 to an output 15 of the recording and read device. The signal-muting circuit 14 is a circuit of a customary type that passes or inhibits the passing of the signal Vi' to the output 15 in response to a control signal on the control input 16.

For controlling the recording and read device, the device comprises a control unit 17, including, for example, a microcomputer coupled to the control inputs 8, 10 and 16, a control input 18 of the positioning mechanism 5, the output 13 of the demodulating circuit 11, and an output 19 of an address detection circuit 20 for detecting the addresses of the scanned parts of the record carriers in response to an output signal of the read/write head 4. When the record carrier 1 as described in aforementioned document EP-A-0 325 330 is used, the detection circuit may be of a type described in detail in said Application. However, different customary address detection circuits may also be used.

The device further includes a control panel 21 for the user to feed the necessary control data. The fed data can be supplied to the control unit 17 in a customary fashion over a bus 22. The recording of the information signals is customarily controlled by means of the control unit 17. The construction of the control unit as such is not a feature of the present invention and will therefore not be described in detail.

The control unit 17 according to the invention is arranged to provide for recording, subsequent to the information signals, control data (which essentially corresponds to edit data) on the record carrier which indicates passages of the information signal for which reproduction is undesired (this control data will be denoted "skip" information hereinafter for brevity). Such passages may consist, for example, of passages that have been recorded erroneously or undesiredly. Edit data indicating these passages in the information signal can be entered by the user by means of the control panel 21. For feeding the edit data and controlling the recording of "skip" information derived therefrom, the control unit contains a suitable program which, for example, is called as a reaction to depressing an appropriate key on the control panel 21. The flow chart of a suitable program is represented in FIG. 2a.

Figure 2A:
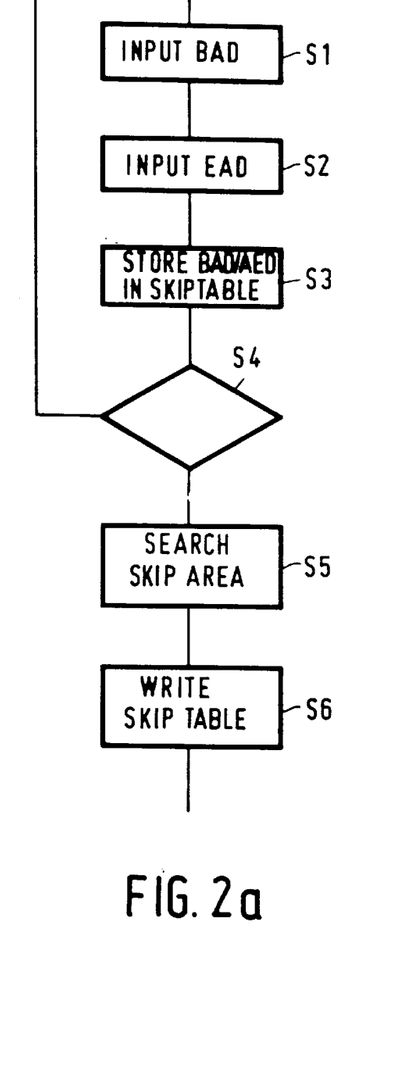
FIGS. 2, 9, 10 and 11 show flow charts of programs executed by a controller in the device according to the invention.

The program represented in FIG. 2a comprises a step S1 in which the control unit 17 reads in an opening address BAD of a passage of a recorded information signal for which reproduction is undesired. In step S2 the closing address EAD of this passage is read in by the control unit 17. The opening address BAD and closing address EAD, both to be entered by the user by means of the control panel 21, can be predetermined by the user while the recorded information signals are being reproduced because the addresses of the reproduced information signal are visualized on an address display arrangement on the control panel 21. In step S3 the entered opening address BAD and closing address EAD are stored in a Skip Table in an internal memory 23 of the control unit 17. In step S4 the user instructs the device whether more edit data is to be entered, for example, by depressing the appropriate key on the control panel. If so, the program will be continued by executing step S1 again. If not, step S5 will be executed. In step S5, under the control of the control unit 17, the read/write head 4 is positioned in a customary fashion opposite a predetermined part of the record carrier intended for recording the "skip" information. Once this step has been finished, the "skip" information is customarily recorded on a record carrier 1 under the control of the control unit 17 (step 5).

Figure 2B:
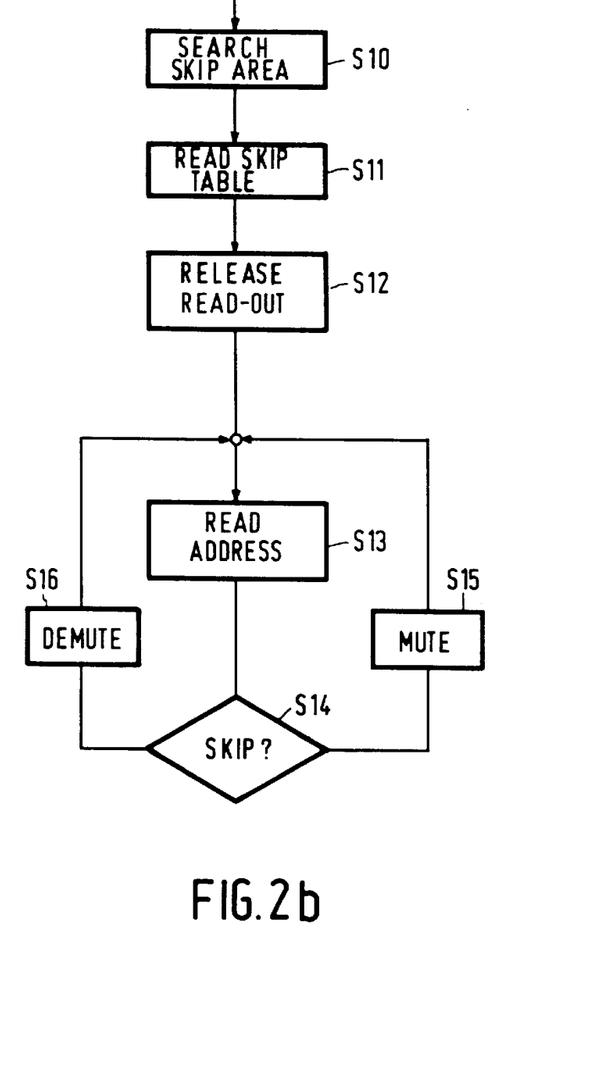

In order to avoid passages indicated by the "skip" information being reproduced when the record carrier 1 is being read out, the control unit 17 contains a suitable program enabling the "skip" information to be read out and actuating the signal muting circuit 14 in response to a suitable control signal when a passage of the information signal indicated by the "skip" information is to be read out. A flow chart of a suitable program is shown in FIG. 2b by way of example. This program is called before the recorded information signals are read out. The program remains active while the information signal is being read out. The first step of the program is referenced S10. When step S10 is executed, the predetermined area on the record carrier in which the "skip" information is stored is scanned under the control of the control unit 17. Once this area has been reached, the "skip" information is read out in step S11 and stored in the internal memory 23 of the control unit 17. Thereafter, step S12 is executed; the reading of the recorded information signals is released so that the reading of the recorded information may be commenced. The reading of the recorded information signals per se does not form part of the present invention and will, therefore, not be described in detail. After the reading operation is released, step S13 is executed. In that step the address of the currently read information signal is determined. In step S14 a decision is made as to whether the address of the information signal that has been read out is situated within the boundaries of the passages of the address ranges indicated by the "skip" information. If so, the control unit 17 will send a control signal to the input 16 of the signal-muting circuit, so that the signal-muting circuit 14 is activated. This circuit blocks the transfer of the read signal Vi' at the output of the output stage 11 to the output 15, and thus, the reproduction of the signal Vi' is not sent to the output 15. If during the execution of step S14 it appears that the address that has been read out lies outside the boundaries defined by the control data, step S16 will be executed and the control unit 17 de-activates the signal-muting circuit 14 so that the read information signal Vi' is passed on to the output 15.

Figure 3:
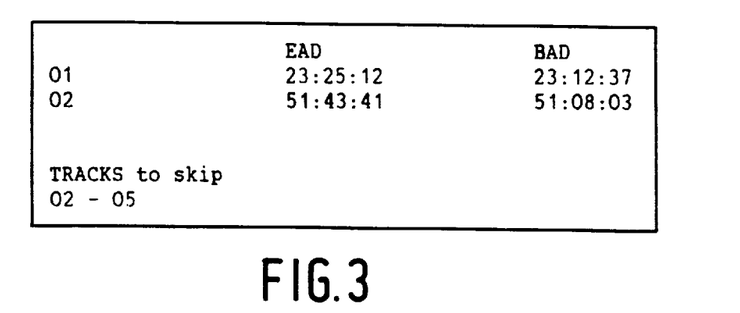
FIG. 3 shows an embodiment of a Skip Table.

The "skip" information may be arranged in numerous ways. By way of example, FIG. 3 represents a Skip Table to be used for recording a standard CD signal. In this Table the addresses EAD and BAD are stated by means of an absolute time code expressed in minutes, seconds and frames. The numbers in the first column denote the line numbers in the Table. In the case of a CD signal, where the reproduction of a recorded information signal, also termed "track", is to be impeded as a whole, this can be indicated in the Skip Table for the relevant track numbers, for example, 02–05 as shown in FIG. 3.

Figure 4:
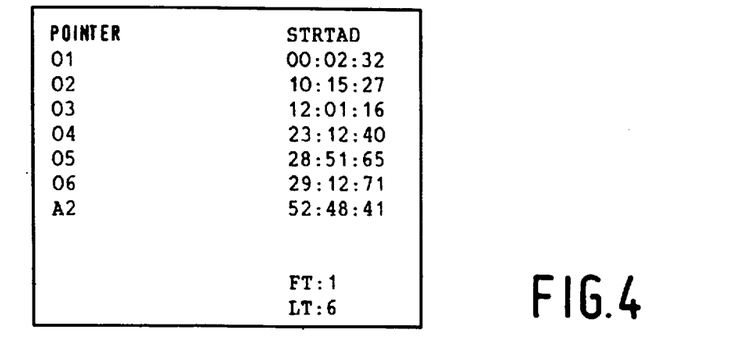
FIG. 4 shows an embodiment of a Table of contents.

These track numbers refer to the tracks in the so-called "Table of contents" recorded with a CD signal on the record carrier. By way of illustration FIG. 4 shows the data included in the "Table of contents" (TOC). The first column headed POINTER comprises the track numbers 1–6. Furthermore, in this column the code A2 denotes the beginning of the so-called lead-out track. In the column headed "STRTAD", the opening addresses of the tracks are shown in minutes, seconds and frames. The "Table of contents" denotes the number of the first track "FT" and the last track "LT".

Figure 5:
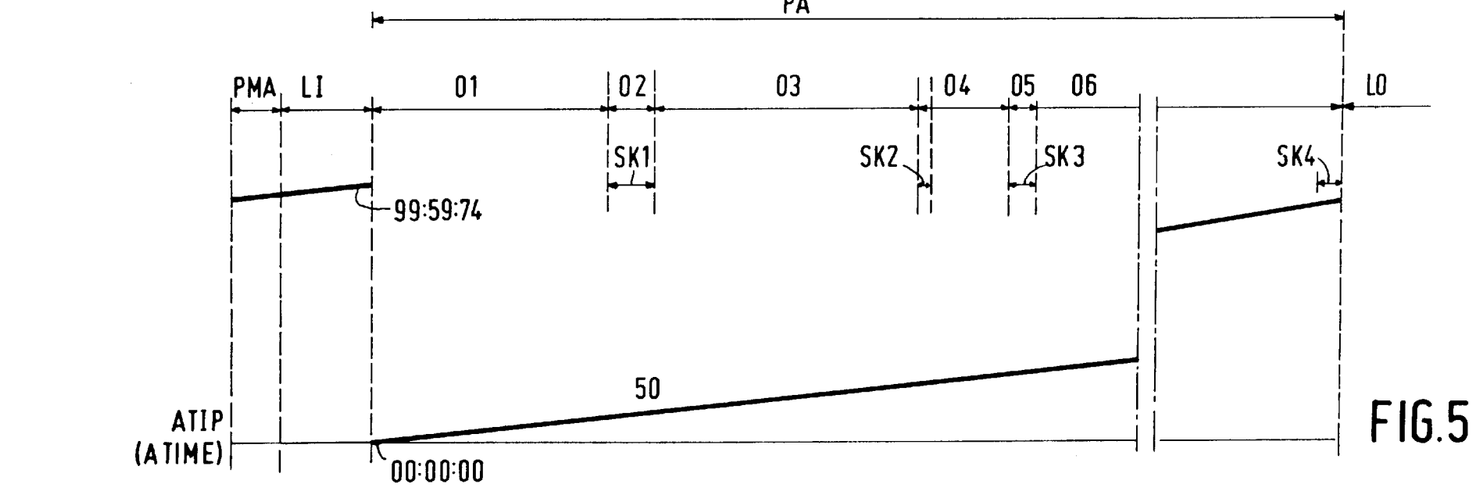
FIG. 5 shows the positions at which the various signals are recorded on the record carrier.

The arrangement of the record carrier belonging to FIGS. 3 and 4 is shown in FIG. 5. In this Figure the record carrier is subdivided into a part termed PMA, intended for recording a temporary Table of contents and any temporary Skip Table as will be described in detail hereinafter;

a part termed LI (Lead-In), intended for recording the Table of contents in which a final Skip Table is included;

a part termed PA intended for recording the information signals; in the example shown the tracks are denoted by their serial numbers and;

a part termed LO in which the so-called "Lead-Out" track is recorded.

SK1, SK2, SK3 and SK4 denote the passages for which reproduction is undesired. These passages refer to the complete tracks 02 and 05, the beginning of track 04 and the end of track 06.

Furthermore, FIG. 5 shows by means of the solid line 50 the address value (ATIP or ATIME) of the parts in which this information is contained, expressed in minutes, seconds and frames.

Figure 6:
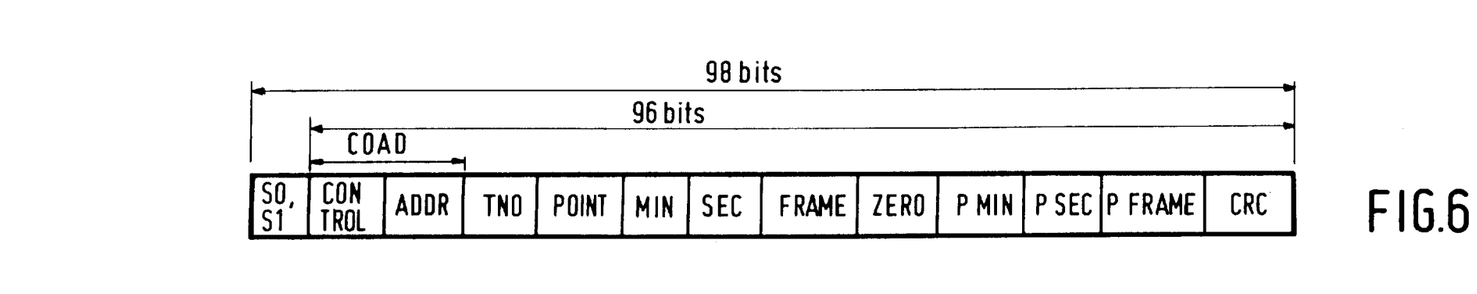
FIG. 6 shows the format of the subcode Q-frames of a standard CD signal.

The "skip" information of the Skip Table may be recorded on the record carrier in many ways. The "skip" information is preferably recorded as subcode information. The subcode Q channel is particularly suitable for recording CD signals. The information in the subcode Q channel is subdivided into subcode frames having a format represented in FIG. 6. Each frame comprises 98 bit positions of which the first two bit positions and S1 are used for purposes of synchronization. The remaining 96 bit positions are distributed over twelve bit groups as shown in FIG. 6. The combination of the bit groups CONTROL and ADDR will also be denoted COAD in the following.

Figure 7:
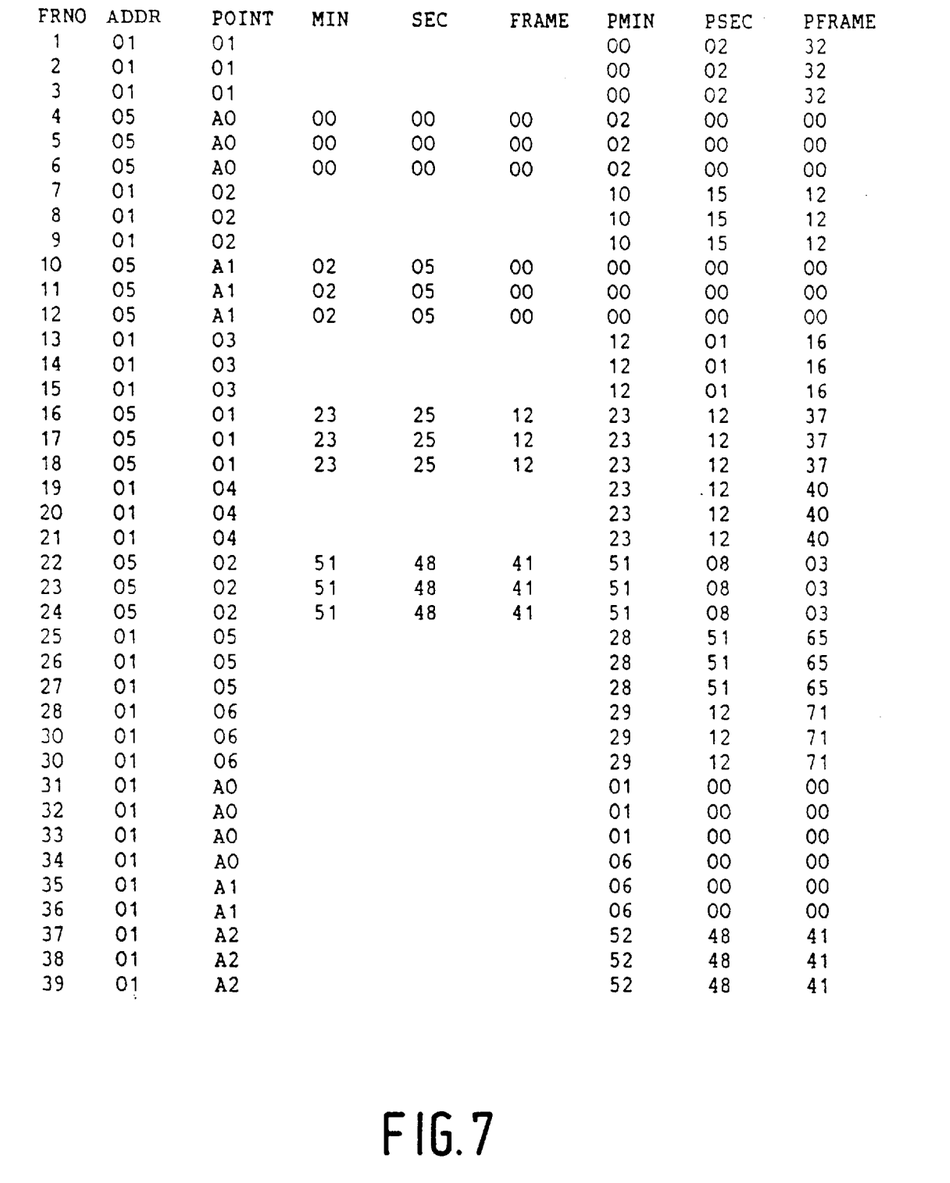
FIG. 7 shows a combined Table of contents and Skip Table in a form suitable for recording in the Lead-In track of the record carrier.

FIG. 7 shows by way of example how the data of the Skip Table and the Table of contents can be arranged in the subcode Q signal recorded in the part LI. In FIG. 7, the column FRNO denotes the subcode frame numbers. The other columns represent the contents of the various bit groups. In the arrangement shown in FIG. 7, the contents of each frame are repeated three times. The frames containing information about the addresses of the recorded tracks are marked by the value 01 in bit group ADDR. The frames containing information of the Skip Table are marked by the value 05 in the bit group ADDR. Groups of frames containing information of the Table of contents alternate with groups of frames containing information of the Skip Table. With the groups of information of the Table of contents, marked by the value 01 in bit group ADDR, the value of the bit group POINT denotes the serial number of the tracks 01–99. The combination of ADDR=01, POINT=A2 indicates the Lead-Out track. The associated values of the bit groups PMIN, PSEC, and FRAME indicate the opening address of the denoted track. The combination of ADR=01, POINT=A0 indicates in the associated bit group PMIN that it denotes the serial number of the first track on the record carrier. The combination of ADDR=1, POINT=A1 similarly indicates that the bit group PMIN contains the serial number of the last track on the record carrier. The combination of ADDR=05, POINT=A0 indicates that the bit group PMIN contains regions with "skip" information of the Skip Table (in this example this number is equal to two, denoting two regions that is to say, the regions denoted by the combination of ADDR=05, POINT=01, and the combination of ADDR=05, POINT=02.) The combination of ADDR=05, POINT=A1 indicates that the bit groups MIN, SEC, FRAME, PMIN, PSEC and PFRAME may contain track numbers for which reproduction as a whole is undesired. The combination of ADDR=05, POINT=01–99 indicates that the associated combination of bit groups PMIN, PSEC and PFRAME and the combination of bit groups MIN, SEC and FRAME respectively, denote the opening address and the closing address of a passage for which reproduction is undesired. In FIG. 7, only the combinations of ADDR=05, POINT=01 and ADDR=05 and POINT=02 are shown.

FIG. 7 shows the contents of the frames in which all information about the Skip Table and the Table of contents are included once. This information is constantly repeated till the end of part LI.

The recording of the Table of contents will not be effected until the user has decided that no further information signals need to be recorded. For that matter, the format of the Table of contents prescribed by the CD standard is such that it cannot be composed until all addresses of the recorded signals are known. As long as still further information signals are to be recorded, the address information can be recorded over the already recorded information signals in the region PMA, as is described in detail in Dutch Patent Application No. 8902931 (PHN 13.148), which Application is hereby considered included in this description by way of reference.

Figure 8:
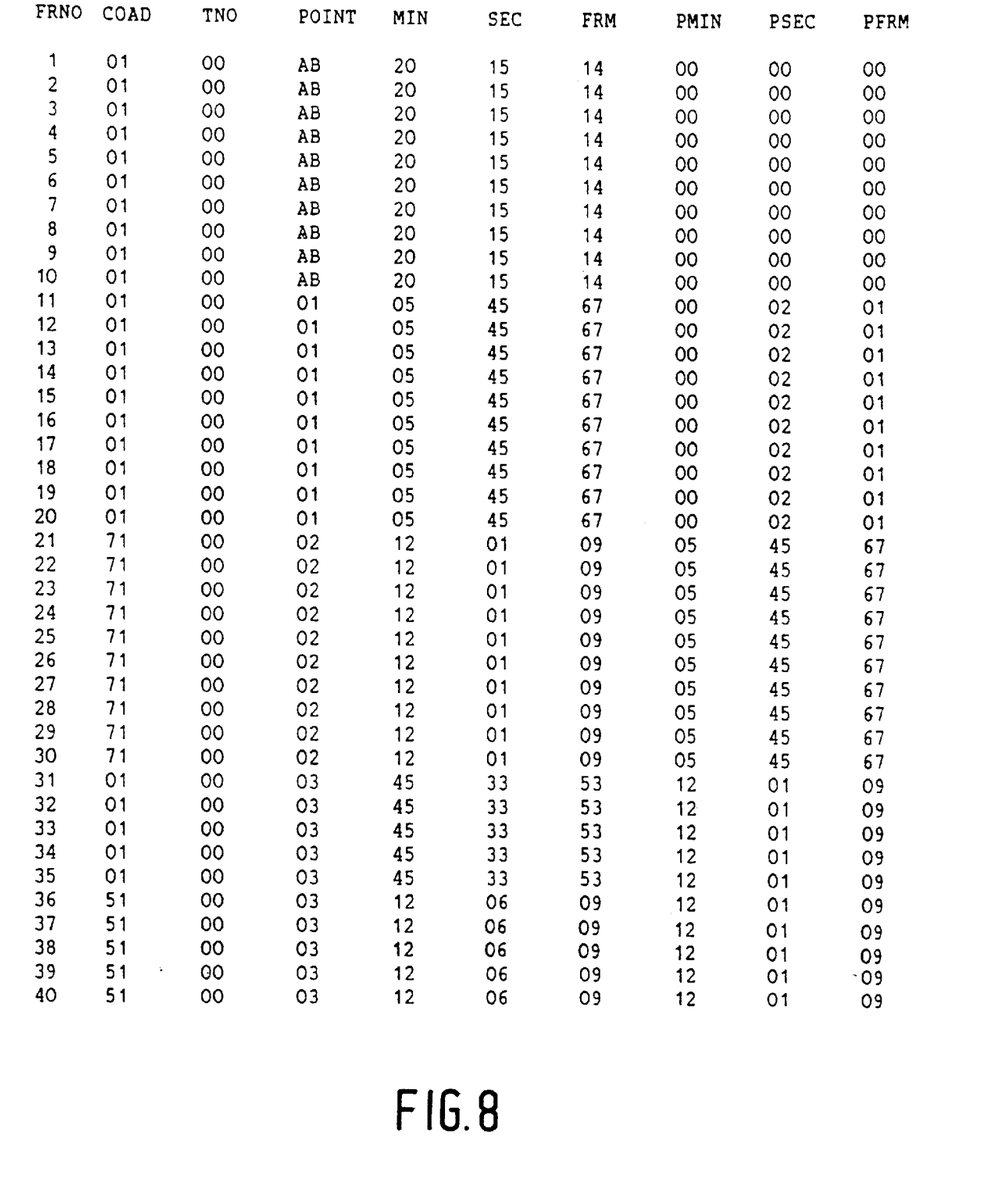

This temporary Table of contents is preferably always adapted shortly before the record carrier is removed from the recording device 24, after one or a plurality of information signals has or have been recorded. This is also a suitable moment for the user to feed the edit data. The edit data can be included in the temporary Table of contents included in the subcode signal to be recorded in the PMA region. A format suitable for this purpose is represented in FIG. 8. In FIG. 8, the column headed FRNO represents the serial number of the subcode Q frames in the PMA region. The other columns represent the values of the various bit groups within each subcode frame. In essence, the contents of each line of the Table are recorded ten times in a row. The bit group POINT indicates the track number, whereas the bit group combination of PMIN, PSEC, PFRAME indicates the opening address and the bit group combination of MIN, SEC and FRAME the closing address of the track. However, the AB bit combination in the bit group POINT indicates that the bit groups of MIN, SEC, FRAME contain record carrier identification. The value of 71 of the bit group combination of COAD indicates that the reproduction of the complete track between the relevant opening and closing addresses is undesired. If the reproduction of a passage not being a complete track is undesired, this can be indicated by repeating for a specific track the information about the opening and closing addresses of the track not ten times but less often, for example, five times. In the space falling vacant then the opening and closing addresses of the passages whose reproduction is undesired can be indicated. In FIG. 8 these opening and closing addresses are included in the frames marked by the value of 51 in the COAD bit group combination of the frame.

FIG. 8a shows an attractive embodiment of a format of the temporary Table of contents with the edit data included. The column FRNO in FIG. 8a again represents the frame number. The information in the format shown is recorded five times in a row. COAD=01 indicates that the frame in question contains the track number (in bit group POINT), the opening address of the track involved (in the bit group combination of PMIN, PSEC, PFRM) and the closing address (in the bit group combination of MIN, SEC, FRM).

COAD=2 indicates that the bit group combination of MIN, SEC, FRM in the relevant frame contains a record carrier identification code. COAD=3 indicates that the relevant frames in the bit groups of MIN, SEC, FRM, PMIN, PSEC, PFRM contain a plurality of track numbers whose reproduction is undesired. In the FIG. 8a shown they are the tracks 2, 3 and 4 which is denoted in the bit groups of MIN, SEC, FRM. The information of COAD=3 in a frame will henceforth be denoted a "Skip Track" command. COAD=4 denotes that the relevant frame contains information expressing that an indication in previous frames stating that a specific track is not to be reproduced, is no longer valid.

In FIG. 8a, frames 46–50 denote in the bit groups of MIN and SEC that the tracks having track numbers 3 and 4 may be reproduced indeed. The information in the combination of frames 31–35 and frames 46–50 thus indicates that only the reproduction of the track having track number 2 is undesired. The information in a frame COAD=4 will henceforth be denoted an "Unskip Track" command. COAD=5 denotes that the frame involved contains the opening and closing addresses of part of the recorded information, whose reproduction is undesired. The bit group combination of PMIN, PSEC, PFRM contains the opening address whereas the bit group combination of MIN, SEC, FRM contains the closing address. The information in a frame of COAD=5 will henceforth be termed a "Skip Time Interval" command. The bit group POINT indicates the serial number of a "Skip Time Interval" command. COAD=6 indicates that the frame involved contains information denoting that Skip Time Interval commands in previous frames are no longer valid. This is effected by including in the bit groups of MIN, SEC, FRM, PMIN, PSEC, PFRM the serial numbers of the Skip Time Interval commands that are no longer valid.

In FIG. 8a, it is thus shown in frames 56–60 in bit group MIN that the Skip Time Interval command that has serial number 01 (in frames 36–40) is no longer valid.

The format represented in FIG. 8a allows previously selected edit data to be constantly adapted. This is an advantage compared to the format represented in FIG. 8, where the effect of already recorded edit data can no longer be undone. The information represented in FIG. 8a indicates as a whole that there are four recorded tracks (01, 02, 03 and 04) having the respective opening addresses 00:02:01; 05:45:67 and 12:01:09 and 30:17:42 and the respective closing addresses 05:45:67, 12:01:09; 30:17:42 and 37:50:18. The reproduction of track 02 of these addresses is not desired. In addition, the reproduction of the interval between addresses 12:01:09 and 12:09:06 is not desired either.

Figure 9:
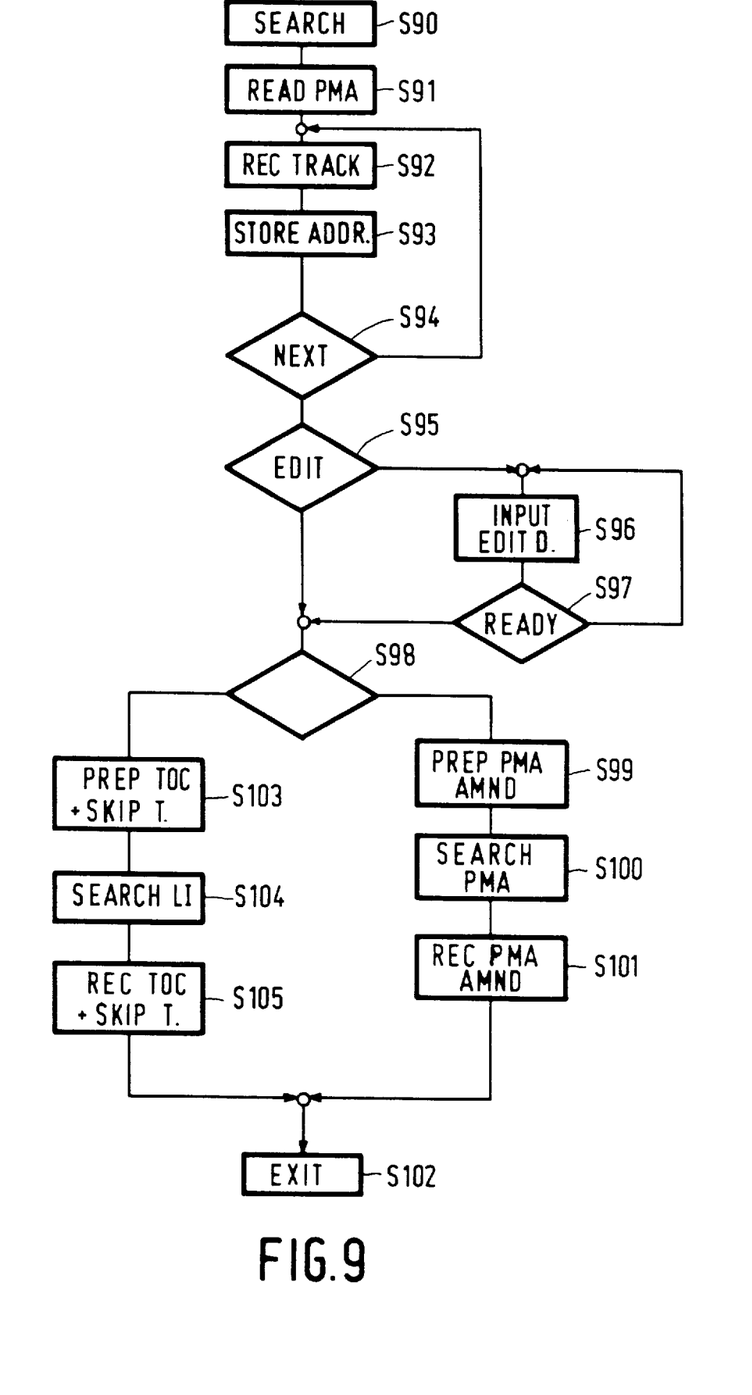

FIG. 9 shows a flow chart of a program executed for controlling the recording of the temporary Table of contents in the part PMA and controlling the recording of the Table of contents in the part LI. The program is called immediately after a record carrier is inserted into the recording device. The first step carried out in the program is step S90. In that step, the read/write head 4 is positioned opposite the part PMA. Once the read/write head has reached this part, it is read out during the execution of step S91. From the subcode information read out which is applied to the control unit 17 via output 13 of the output stage, the addresses of the already recorded information signals and the "skip" information are derived and stored in the memory 23. Subsequently, when step S92 is executed, a new information signal can be recorded on the record carrier. After this recording has been effected, the opening and closing addresses of this newly recorded information signal are loaded into memory 17 in step S93. In step S94, the user instructs the device whether the recording of a next information signal is desired. If so, step S92 is executed once more. If not, in step S95, the user instructs the device as to whether edit data will be entered. If so, an opening and a closing address of a passage or a track number entered by the user are recorded by the control unit 17 in step S96. In step S97, the user instructs the device whether more edit data will be entered. If so, the program will return to step S96. Step S98 will be executed if it has been established in step S97 or step S95 that no further edit data needs to be recorded In step S98, the user instructs the device whether future recordings of further information signals on the record carrier are desired. If they are, step S99 is executed. In this step, the information to be added to the temporary Table of contents in the PMA part is derived from the opening and closing addresses of the newly recorded information signals and the newly entered edit data, in accordance with the rules explained with reference to FIG. 8 or FIG. 8a. In step S100, the read/write head 4 is disposed opposite the PMA part. Once the end of the temporary Table of contents recorded in the PMA part has been reached, in step S101 the addition determined in step S99 and the temporary Table of contents are recorded by bringing the read/write head 4 into the write mode and then feeding to the signal 8 of the input formatting circuit 7 the information signals to be added. Subsequent to step S101, step S102 is executed. In step S102 the record carrier is ejected from the recording device.

However, if during the execution of step S98 it has been established that recording of further information signals is undesired, step S103 is proceeded to. When this step S103 is executed, the Table of contents and the Skip Table are formed from: the data of the temporary Table of contents read out in step S91, "skip" information (Skip Track, Unskip Track, Skip Time interval and Unskip Time Interval commands), the opening and closing addresses of the newly recorded information signals and the newly entered edit data.

Figure 9A:
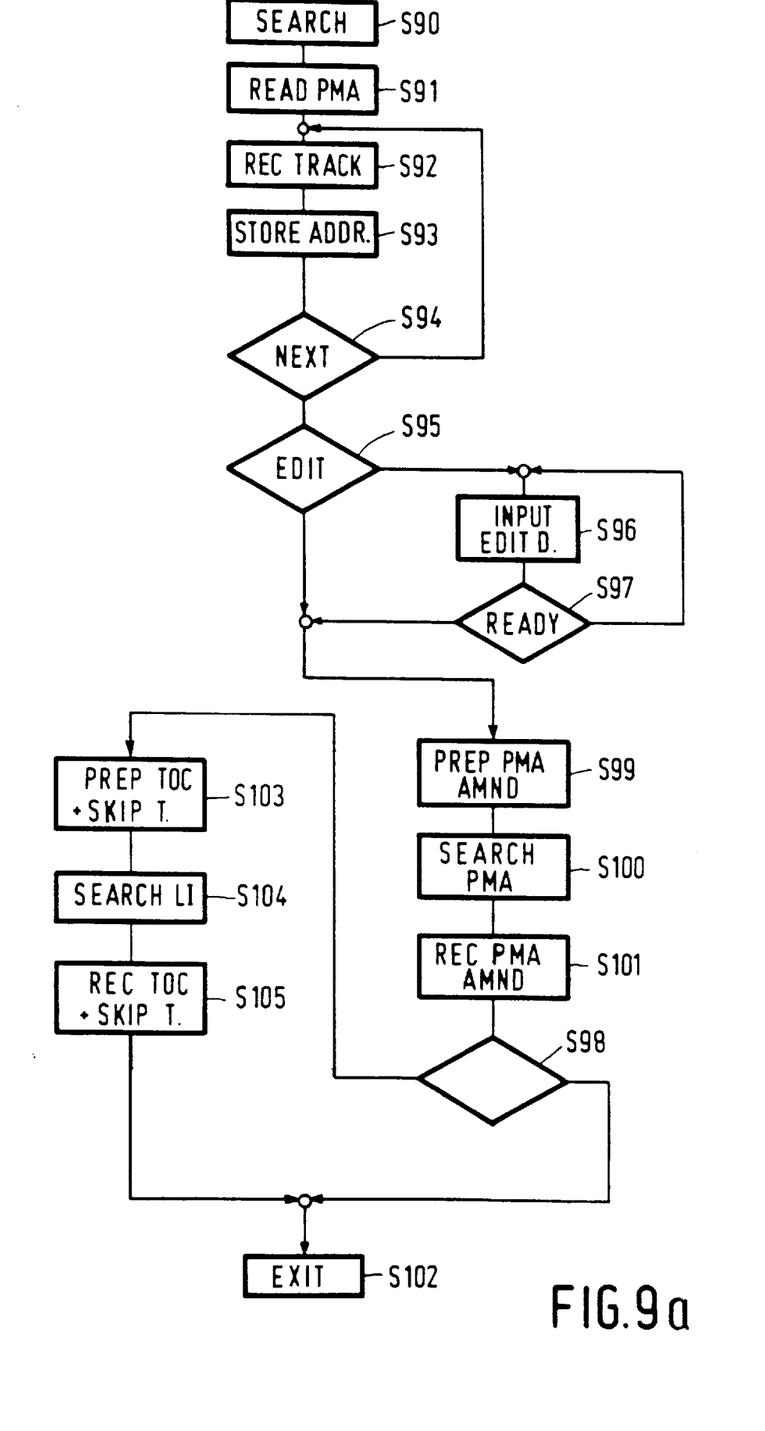

FIG. 9a shows another embodiment of the program for controlling the recording of the temporary Table of contents in the PMA part and of the recording of the Table of contents in the LI part. In this Figure the program steps used are similar to those shown in FIG. 9. Only the order of execution has been adapted. Step S98 of FIG. 9a, in which it is established whether future recordings of further information signals are desired, will not be executed until the information in the temporary Table of contents has been updated (step S99–S101). This is advantageous in that after the recording of the information in the final Table of contents, it will correspond better to the information in the temporary Table of contents and the temporary Skip Table in the PMA part. With this option, it remains possible to derive the information necessary for controlling the reading of the recorded information from the temporary Table of contents and the temporary Skip Table.

The information of the final Table of contents and final edit data is combined according to the format rules explained with reference to FIG. 7. In step S104, the read/write head 4 is disposed opposite the LI part. Once the read/write head 4 has reached that part, step, S105 is executed. In this step the information assembled in step S103 is recorded by bringing the read/write head 4 into the write mode and feeding the information to be recorded to the input 8 of signal formatting circuit 7. The recording of the data is constantly repeated until the end of the LI part is reached, after which the recording is terminated. Subsequently, when step S102 is executed, the record carrier is ejected by the device 24.

Figure 10:
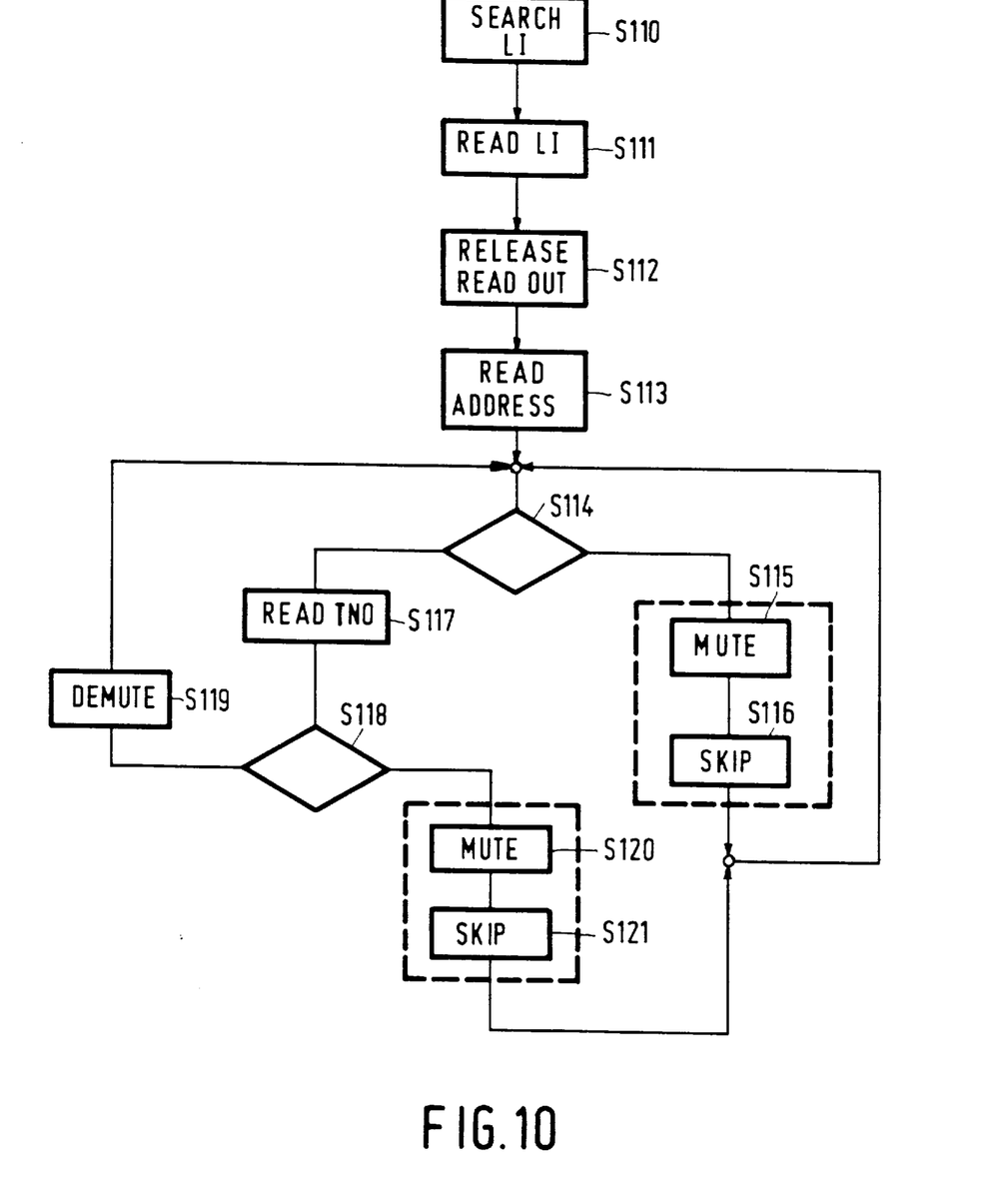

FIG. 10 shows a flow chart of the program executed by the control unit to avoid the passages shown in the Skip Table being reproduced. This program is implemented, for example, immediately after the first read command has been given, once the record carrier has been inserted in the reading device. The first step executed is step S110. In that step the read/write head 4 is disposed opposite the LI part. After this part has been reached, it is read out in step S111, and the "skip" information is separated from the subcode signal applied via output 13 of demodulating circuit 11 to the control unit 17 and stored in the memory 23. In addition, on the basis of the bit groups ADDR and CONTR, it is established whether a frame read from the Table of contents (final or possibly temporary Table of contents) contains edit data which is then stored in a memory of the device. Subsequently, in step S112 the reading of the information signals is released. In step S113 the address of the information read out is determined. In step S114, a determination is made as to whether this address is between the opening and closing addresses of the passages shown in the Skip Table. If so, the transfer of the read information signal Vi' to the output 15 is blocked in step S115. Then, in step S116, the read/write head 4 is moved to the part of the record carrier indicated by the closing address of the undesired passage, for example, by means of a track jump. Then the program is resumed with the execution of step S114. Step S117 will be executed if in step S114 it is established that the address read is not situated within the limits of the passages shown in the Skip Table. In step S117, the track number of the currently read information is determined. In step S118, a determination is made as to whether the track number of the currently read track is indicated as undesired in the Skip Table. If not, the program proceeds with step S119. In step S119 the signal-muting circuit 14 is brought into a condition in which the read information signal Vi' is transferred to output 15. Then the program resumes with step S114. Step S120 will be executed if in step S118 it is established that the reproduction of the information of the specific track number is undesired. In step S120, the signal-muting circuit 17 is brought into the condition in which the transfer of the read signal Vi to the output 15 is blocked. Then, in step S121, the read/write head 4 is moved to the end of the track. The program is subsequently resumes with step S114.

Figure 11A:
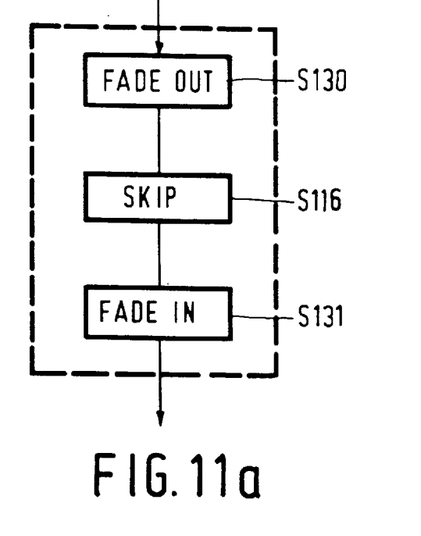

By executing the program shown in FIG. 10, the reproduced information signal shows abrupt changes from conditions in which a signal that has been read out is blocked to conditions in which the signal that has been read out is transferred and vice versa. The user often experiences this as an annoying factor. Therefore, it is to be preferred to have these transitions take place more gradually, that is to say, that during a transition the signal delivered is faded in or faded out. This can be achieved by inserting in the signal-muting circuit a variable gain amplifier that can be adjusted by the control unit 17. The program steps S120 and S121 and the steps S115 and S116 can be replaced by the three steps represented in FIG. 11a. In this Figure, step S130 is a step in which the produced information signal fades out. When step S131 is executed, the signal fades in again.

Figure 11B:
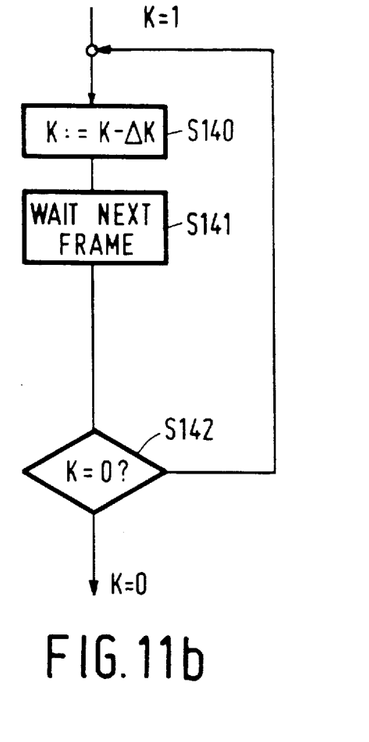

Step S130 may consist, for example, of a number of sub-steps S140, S141, S142 as represented in FIG. 11b. In step S140 the gain of the signal-muting circuit 14 is reduced by a fraction $\Delta K$. Then, in step S141, the detection of the beginning of the next frame is waited for. In step S142, a determination is made as to whether the gain factor has decreased to zero. If it has, the program resumes with step S120 (S116). If it has not, the gain factor is reduced even more in step S140.

Figure 11C:
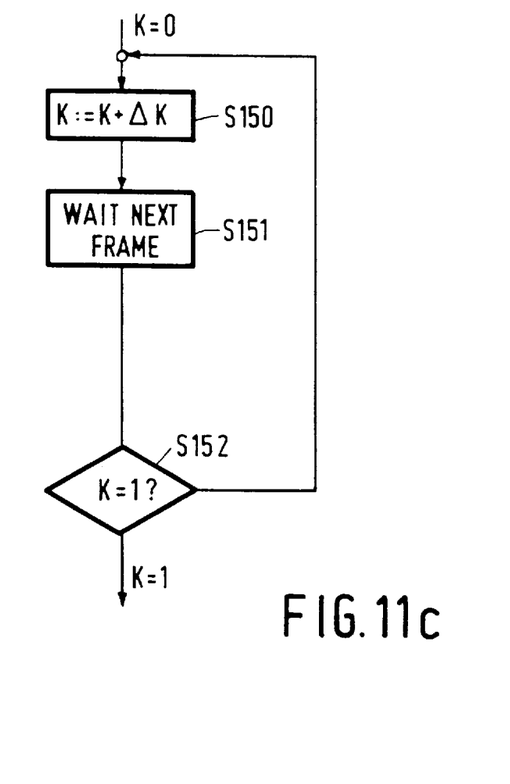

Step S131 may also consist of a number of sub-steps S150, S151 and S152. In step S150 the gain factor K is increased by a fraction $\Delta K$. Then, in step S151, the detection of the beginning of a next frame is waited for. In step S152, a determination is made as to whether the gain factor K has reached the value of 1. If it has, step S114 (see FIG. 10) is then executed. If it has not, the gain factor is again increased by the fraction ΔK in step S150.

It should be observed that in case the reproduction of a complete track is undesired, the fading out, or fading in, of the reproduction can in most cases be omitted.

The foregoing illustrates use of the invention for an optical recording and read device. However, the invention is not restricted to optical recording and read devices. It is also applicable to magnetic recording and read devices, such as, for example, a magnetic DAT recorder/player or a magneto-optical recorder/player.

We claim:

1. A recording device, comprising:

recording means for recording at least edit data on a record carrier having at least information signals recorded thereon, the edit data including at least skip information or restore information, the skip information identifying at least one information signal or a portion thereof recorded on the record carrier for which reproduction is undesired, the restore information denoting that skip information previously recorded on the record carrier is invalid; and control means for causing said recording means to record at least the edit data.

2. The device as claimed in claim 1, wherein the record carrier further includes a Table of contents recorded thereon, the Table of contents including identifying data identifying where on the record carrier information signals have been recorded.

3. The device as claimed in claim 1, wherein the recording means is further adapted for recording a Table of contents on the record carrier, the Table of contents including identifying data identifying where on the record carrier information signals have been recorded.

4. The device as claimed in claim 3, wherein said control means is further adapted for causing said recording means to record a provisional Table of contents on the record carrier, the provisional Table of contents having opening and closing addresses of the information signals recorded on the record carrier in its identifying data; for deriving a final Table of contents from the provisional Table of contents and the edit data, the final Table of contents including the opening addresses of the information signals recorded on the record carrier in its identifying data and the edit data; and for causing said recording means to record the final Table of contents on the record carrier.

5. The device as claimed in claim 4, wherein the provision Table of contents includes at least some of the edit data.

6. The device as claimed in claim 4, wherein the recording means is adapted for recording on a write-once type record carrier.

7. The device as claimed in claim 3, further comprising formatting means for formatting, prior to recording, the Table of contents and the edit data in accordance with a data format in which bit group combinations representing identifying data alternate with bit group combinations representing edit data.

8. The device as claimed in claim 3, wherein the Table of contents includes the edit data.

9. The device as claimed in claim 8, further comprising formatting means for formatting, prior to recording, the Table of contents in accordance with a data format in which bit group combinations representing identifying data alternate with bit group combinations representing edit data.

10. The device as claimed in claim 8, wherein the device further comprises formatting means for converting, prior to recording, the Table of contents into a recording signal having main data and subcode data, the subcode data having subcode frames, the Table of contents being included in the subcode frames, subcode frames including identifying data being recognizable from a first bit combination and subcode frames including edit data being recognizable from a second bit combination distinguishable from the first bit combination; and wherein said control means is adapted for causing the recording means to record the recording signal on the record carrier in a location other than where the information signal are recorded.

11. The device as claimed in claim 8, wherein the recording means is adapted for recording on a write-once type record carrier.

12. The device as claimed in claim 3, wherein the device further comprises formatting means for converting, prior to recording, the Table of contents and the edit data into a recording signal having main data and subcode data, the subcode data having subcode frames, the Table of contents and edit data being included in the subcode frames, subcode frames including identifying data being recognizable from a first bit combination and subcode frames including edit data being recognizable from a second bit combination distinguishable from the first bit combination; and wherein said control means is adapted for causing the recording means to record the recording signal on the record carrier in a location other than where the information signal are recorded.

13. The device as claimed in claim 3, wherein the recording means is adapted for recording on a write-once type record carrier.

14. The device as claimed in claim 1, wherein the recording means is adapted for recording on a write-once type record carrier.

15. A read device having an output, comprising:

read means for (i) reading information signals and edit data which have been recorded on a record carrier, and (b) supplying information signals or portions thereof read from the record carrier to said output, the edit data including skip information identifying at least one information signal or a portion thereof recorded on the record carrier for which reproduction is undesired;

inhibiting means for preventing production at said out of the at least one information signal or the portion thereof recorded on the record carrier for which reproduction is undesired; and control means for controlling said inhibiting means in accordance with the edit data.

16. The device as claimed in claim 15, wherein the record carrier further comprises a Table of contents including identifying data identifying where on the record carrier the information signals have been recorded, and said read means is further adapted to read the Table of contents.

17. The device as claimed in claim 15, wherein said inhibiting means is adapted to cause said read means to skip reading of the at least one information signal or the portion thereof recorded on the record carrier for which reproduction is undesired.

18. The device as claimed in claim 15, wherein said inhibiting means comprises means for blocking production at said output of the at least one information signal or the portion thereof recorded on the record carrier for which reproduction is undesired.

19. The device as claimed in claim 15, further comprising means for at least fading in or fading out production at said output of at least one of the information signals or a portion thereof recorded on the record carrier, an information signal or a portion thereof being faded in to a normal level at said output when it immediately follows an information signal or a portion thereof recorded on the record carrier for which reproduction is undesired, an information signal or a portion thereof being faded out to a zero level at said output when it immediately precedes an information signal or a portion thereof recorded on the record carrier for which reproduction is undesired.

20. The device as claimed in claim 15, further comprising means for recognizing identifying data and edit data recorded on the record carrier on the basis of unique bit combinations affixed to each type of data.

21. A method of recording on a record carrier having at least information signals recorded thereon data pertaining to the information signals recorded on the record carrier, comprising:

determining at least one information signal or a portion thereof recorded on the record carrier for which reproduction is undesired; and recording edit data on the record carrier, which edit data includes skip information identifying at least one information signal or a portion thereof for which reproduction is undesired.

22. The method as claimed in claim 21, wherein invalid skip information has been recorded on the record carrier, and the method further comprises the step of recording additional edit data on the record carrier, which additional edit data includes restore information identifying the invalid skip information.

23. The method as claimed in claim 21, further comprising including the edit data in a Table of contents having identifying data identifying where on the record carrier information signals have been recorded, and recording the Table of contents on the record carrier.

24. The method as claimed in claim 23, further comprising converting the Table of contents, prior to recording it, into a recording signal having main data and subcode data, the subcode data having subcode frames, the Table of contents being included in the subcode frames, subcode frames including identifying data being recognizable from a first bit combination and subcode frames including edit data being recognizable from a second bit combination distinguishable from the first bit combination; and recording the recording signal on the record carrier in a location other than where the information signal are recorded.

25. The method as claimed in claim 21, further comprising recording a provisional Table of contents having opening and closing addresses of the information signals recorded on the record carrier prior to recording the edit data; and after the edit data has been recorded deriving a final Table of contents from at least the provisional Table of contents and the edit data and recording the final Table of contents on the record carrier, the final Table of contents including the opening addresses of the information signals recorded on the record carrier and the edit data.

26. A method of reproducing information signals or portions thereof recorded on a record carrier, the record carrier further including edit data, the edit data including skip information identifying at least one information signal or a portion thereof recorded on the record carrier for which reproduction is undesired, the method comprising:

reading the record carrier to obtain the edit data; and reproducing the information signals or portions thereof recorded on the recorded carrier which are not identified in the edit data as being an information signal or a portion thereof for which reproduction is undesired.

27. The method as claimed in claim 26, wherein the record carrier further comprises a Table of contents including identifying data identifying where on the record carrier information signals have been recorded, and the method further comprises reading the Table of contents along with the edit data.

28. The method as claimed in claim 26, wherein an information signal or a portion thereof recorded on the record carrier immediately preceding an information signal or a portion thereof which is recorded on the record carrier for which reproduction is undesired is faded out to a zero level during reproduction.

29. The method as claimed in claim 26, wherein on information signal or a portion thereof recorded on the record carrier immediately succeeding an information signal or a portion thereof which is recorded on the record carrier for which reproduction is undesired is faded in to a normal level during reproduction.

* * * * *